US012357030B2

(12) United States Patent
Xiao

(10) Patent No.: US 12,357,030 B2
(45) Date of Patent: Jul. 15, 2025

(54) ELECTRONIC VAPORIZATION DEVICE PROVIDING SUFFICIENT AIR FLOW

(71) Applicant: SHENZHEN SMOORE TECHNOLOGY LIMITED, Guangdong (CN)

(72) Inventor: Minfeng Xiao, Shenzhen (CN)

(73) Assignee: SHENZHEN SMOORE TECHNOLOGY LIMITED, Shenzhen (CN)

(*) Notice: Subject to any disclaimer, the term of this patent is extended or adjusted under 35 U.S.C. 154(b) by 427 days.

(21) Appl. No.: 17/932,417

(22) Filed: Sep. 15, 2022

(65) Prior Publication Data

US 2023/0088232 A1 Mar. 23, 2023

(30) Foreign Application Priority Data

Sep. 18, 2021 (CN) ......................... 202122279860.1

(51) Int. Cl.
*A24F 40/485* (2020.01)
*A24F 40/46* (2020.01)
*H05B 3/03* (2006.01)

(52) U.S. Cl.
CPC ............ *A24F 40/485* (2020.01); *A24F 40/46* (2020.01); *H05B 3/03* (2013.01); *H05B 2203/016* (2013.01)

(58) Field of Classification Search
CPC ........ A24F 40/485; A24F 40/46; A24F 40/40; A24F 40/10; H05B 3/03
See application file for complete search history.

(56) References Cited

U.S. PATENT DOCUMENTS

2023/0320425 A1* 10/2023 Ouyang ................ A24F 40/485 131/329
2023/0329346 A1* 10/2023 Ou .......................... A24F 40/40
2024/0000151 A1* 1/2024 Zhou ....................... A24F 40/10
2024/0237746 A1* 7/2024 Wu ......................... A24F 40/51

FOREIGN PATENT DOCUMENTS

CN 210353142 U 4/2020

OTHER PUBLICATIONS

Chinese Patent Office, First Office Action in Chinese Patent Application No. 202122279860.1 (Nov. 9, 2022).

* cited by examiner

*Primary Examiner* — Hae Moon Hyeon
(74) *Attorney, Agent, or Firm* — Leydig, Voit & Mayer, Ltd.

(57) ABSTRACT

A vaporizer, cooperating with a main unit to implement vaporization, includes: a shell in which an air outlet channel is formed; a vaporization assembly having a vaporization channel in communication with the air outlet channel; and an electrode assembly mated with the vaporization assembly and including an insulating member, a first electrode, and a second electrode, the insulating member being at least partially sleeved on the vaporization assembly, the first electrode being sleeved in the insulating member, and the second electrode being sleeved outside the insulating member. An air through channel in communication with the vaporization channel is defined and formed between the first electrode and the insulating member.

11 Claims, 7 Drawing Sheets

ELECTRONIC VAPORIZATION DEVICE PROVIDING SUFFICIENT AIR FLOW

CROSS-REFERENCE TO PRIOR APPLICATION

Priority is claimed to Chinese Patent Application No. 202122279860.1, filed on Sep. 18, 2021, the entire disclosure of which is hereby incorporated by reference herein.

FIELD

The present utility model relates to a vaporizer and an electronic vaporization device, and in particular, to a vaporizer and an electronic vaporization device.

BACKGROUND

An aerosol is a colloidal dispersion system formed by solid or liquid small particles dispersed and suspended in an air medium. The aerosol can be absorbed by human body through the respiratory system, providing a user with a novel alternative absorption manner. For example, as an alternative to a conventional product form and absorption manner, a vaporization device generating an aerosol by baking and heating aerosol generation substrates such as herbs or pastes is applied to different fields to deliver an inhalable aerosol to the user.

Generally, the electronic vaporization device heats and vaporizes the aerosol generation substrate by using a vaporizer, and is electrically connected to an electric core through an electrode in the vaporizer, so as to supply power to the vaporizer through the electric core. In addition, an air inlet is provided on the electrode to allow an external air flow to enter a vaporization channel of the vaporizer. However, the air can only enter through the air inlet on the electrode, which may lead to insufficient air inflow.

SUMMARY

In an embodiment, the present invention provides a vaporizer, cooperating with a main unit to implement vaporization, the vaporizer comprising: a shell in which an air outlet channel is formed; a vaporization assembly comprising a vaporization channel in communication with the air outlet channel; and an electrode assembly mated with the vaporization assembly and comprising an insulating member, a first electrode, and a second electrode, the insulating member being at least partially sleeved on the vaporization assembly, the first electrode being sleeved in the insulating member, and the second electrode being sleeved outside the insulating member, wherein an air through channel in communication with the vaporization channel is defined and formed between the first electrode and the insulating member.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
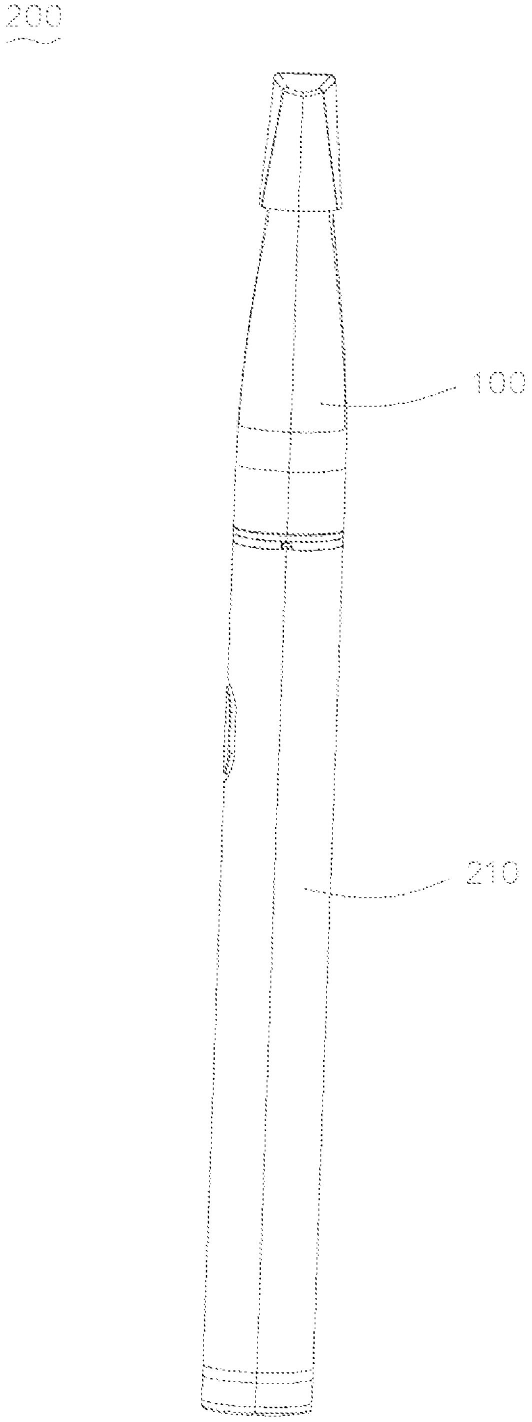
FIG. 1 is a schematic structural diagram of an electronic vaporization device according to an embodiment of the present utility model.

In an embodiment, the present invention provides a vaporizer and an electronic vaporization device to solve the problem of insufficient air inflow in the vaporization device.

A vaporizer cooperates with a main unit to implement vaporization is provided, where the vaporizer includes: a shell, in which an air outlet channel is formed;

a vaporization assembly, including a vaporization channel in communication with the air outlet channel; and an electrode assembly, mated with the vaporization assembly and including an insulating member, a first electrode, and a second electrode, where the insulating member is at least partially sleeved on the vaporization assembly, the first electrode is sleeved in the insulating member, and the second electrode is sleeved outside the insulating member; where an air through channel in communication with the vaporization channel is defined and formed between the first electrode and the insulating member.

In the vaporizer, the first electrode and the second electrode are insulated from each other by an insulating member. In addition, the air through channel in communication with the vaporization channel is defined and formed between the first electrode and the insulating member, and a first air inlet branch and a second air inlet branch that are both in communication with the air through channel are formed on the second electrode. In this way, the external air flow can not only enter the vaporization channel through a hollow channel of the first electrode, but also enter the vaporization channel through the air through channel between the first electrode and the insulating member, so that two branches are formed for the air to enter to increase the air inflow and optimize the vaporization effect.

In an embodiment, when the vaporizer is mounted on the main unit, the second electrode is mated with the main unit to form the first air inlet branch in communication with the air through channel; and a second air inlet branch in communication with the air through channel is formed on the second electrode.

In an embodiment, a plurality of air through holes are provided on the second electrode, the plurality of air through holes are arranged in a circumferential direction of the second electrode, each of the air through holes is in communication with the air through channel, and the plurality of air through holes form the second air inlet branch.

In an embodiment, a mounting through hole runs through the insulating member, and an air through groove in communication with the mounting through hole is provided on an inner wall of the mounting through hole; and the first electrode is sleeved in the mounting through hole, and the air through channel is defined and formed between the first electrode and an inner wall of the air through groove.

In an embodiment, the vaporization assembly includes a vaporization core, the vaporization core includes a first electrode pin and a second electrode pin, and the first electrode pin and the second electrode pin are sleeved at an interval on the insulating member; and the first electrode pin is electrically connected to the first electrode, and the second electrode pin is electrically connected to the second electrode.

In an embodiment, the first electrode pin abuts against an inner wall, which faces the mounting through hole, of the insulating member and is in contact with the first electrode, and the second electrode pin abuts against an outer wall of the insulating member and is electrically connected to the second electrode.

In an embodiment, the shell includes an air outlet end and an assembly end opposite to each other, the air outlet end forms the air outlet channel, and the second electrode is sleeved between the assembly end and the vaporization assembly; a plurality of exhaust grooves are provided on an inner wall of the assembly end, and the plurality of exhaust grooves are arranged at intervals in a circumferential direction of the assembly end; and each of the exhaust grooves includes a first opening and a second opening, the first opening faces the second electrode, and the second opening intersects with and is in communication with the first opening and faces away from an air outlet end.

An electronic vaporization device includes a main unit and the vaporizer, where the main unit includes a body and a matching member that is sleeved on the body, and the second electrode and the matching member are detachably mated, where the first air inlet branch is defined and formed between the second electrode and the matching member.

In an embodiment, a front air inlet channel in communication with the outside is further defined and formed between the second electrode and the matching member; the second electrode includes a first connection portion and a second connection portion, the first connection portion is detachably sleeved on the assembly end, and the second connection portion is connected to the first connection portion and protrudes from the shell;

the first connection portion is butted with the matching member, the front air inlet channel is defined and formed between the first connection portion and the matching member, the second connection portion is detachably connected to the matching member, and a rear air inlet channel is defined and formed between the second connection portion and the matching member; and both the first air inlet branch and the second air inlet branch are communicated between the front air inlet channel and the air through channel.

In an embodiment, the matching member includes a ring body and a protrusion, the protrusion is arranged on an inner wall of the ring body, the second connection portion extends into the ring body and is detachably connected to the protrusion, the first connection portion is butted with the ring body, and the front air inlet channel is defined and formed among the protrusion, the ring body, the first connection portion and the second connection portion; and a plurality of air inlet holes in communication with the front air inlet channel are provided on the ring body.

In an embodiment, the second connection portion is in threaded connection with the matching member, and a gap formed by the threaded connection between the second connection portion and the matching member is configured to form the first air inlet branch.

200. Electronic vaporization device; 100. vaporizer; 10. shell; 12. assembly end; 13. exhaust groove; 16. first opening; 17. second opening; 14. air outlet end; 15. air outlet channel; 20. liquid storage cavity; 30. vaporization assembly; 32. connecting tube; 33. through hole; 34. vaporization core; 35. vaporization channel; 36. first electrode pin; 37. second electrode pin; 40. electrode assembly; 50. insulating member; 51. mounting through hole; 54. air through groove; 60. air through channel; 70. first electrode; 80. second electrode; 81. air through hole; 82. first connection portion; 84. second connection portion; 90. first air inlet branch; 91. second air inlet branch: 92. front air inlet channel; 93. rear air inlet channel; 210. main unit; 211. body; 213. matching member; 214. ring body; 215. air inlet hole; and 216. protrusion.

To make the foregoing objects, features and advantages of the present utility model more comprehensible, detailed description is made to specific implementations of the present utility model below with reference to the accompanying drawings. In the following description, many specific details are provided to facilitate a full understanding of the present utility model. However, the present utility model may alternatively be implemented in other manners different from those described herein, and a person skilled in the art may make similar modifications without departing from the content of the present utility model. Therefore, the present utility model is not limited to the embodiments disclosed below.

In the description of the present utility model, it should be understood that directions or location relationships indicated by terms “center”, “longitudinal”, “transversely”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise” “axial direction”, “radial direction” and “circumferential direction” are directions or location relationships shown based on the accompanying drawings, are merely used for the convenience of describing the present utility model and simplifying the description, but are not used to indicate or imply that a device or an element needs to have a particular direction or be constructed and operated in a particular direction, and therefore, cannot be understood as a limitation to the present utility model.

In addition, the terms “first” and “second” are used merely for the purpose of description, and shall not be construed as indicating or implying relative importance or implying a quantity of indicated technical features. Therefore, features defining “first” and “second” can explicitly or implicitly include at least one of the features. In description of the present utility model, “multiple” means at least two, such as two and three unless it is specifically defined otherwise.

In the present utility model, unless otherwise explicitly specified and defined, terms such as “mounted”, “connected”, “connection”, and “fixed” should be understood in broad sense, for example, the connection may be a fixed connection, a detachable connection, or an integral connection; or the connection may be a mechanical connection or an electrical connection; or the connection may be a direct connection, an indirect connection through an intermediary, or internal communication between two elements or a mutual action relationship between two elements, unless otherwise specified explicitly. A person of ordinary skill in the art can understand specific meanings of the terms in the present utility model according to specific situations.

In the present utility model, unless explicitly specified or limited otherwise, a first characteristic "on" or "under" a second characteristic may be the first characteristic in direct contact with the second characteristic, or the first characteristic in indirect contact with the second characteristic by using an intermediate medium. In addition, the first feature being located "above" the second feature may be the first feature being located directly above or obliquely above the second feature, or may simply indicate that the first feature is higher in level than the second feature. The first feature "under", "below" and "down" the second feature may be that the first feature is directly below or obliquely below the second feature, or simply indicates that a horizontal height of the first feature is less than that of the second feature.

It should be noted that, when a component is referred to as "being fixed to" or "being arranged on" another component, the component may be directly on the another component, or there may be an intermediate component. When a component is considered to be "connected to" another component, the component may be directly connected to the another component, or an intervening component may also be present. The terms "vertical", "horizontal", "upper", "down", "left", "right" and similar expressions used in this specification are only for purposes of illustration but not indicate a unique implementation.

Referring to FIG. 1 to FIG. 5, in an embodiment of the present utility model, an electronic vaporization device 200 is provided, which is configured to heat and vaporize an aerosol generation substrate. Specifically, the electronic vaporization device 200 includes a main unit 210 and a vaporizer 100. The vaporizer 100 is detachably assembled on the main unit 210, and the main unit 210 is configured to supply power to the vaporizer 100. After the vaporizer 100 is electrified and heated, the aerosol is heated and vaporized to generate a substrate, that is, the vaporizer 100 cooperates with the main unit 210 to implement vaporization.

The vaporizer 100 includes a shell 10, a vaporization assembly 30, and an electrode assembly 40. An air outlet channel 15 is formed in the shell 10. The vaporization assembly 30 includes a vaporization channel 35 in communication with the air outlet channel 15, and the electrode assembly 40 is configured to be electrically connected to the vaporization assembly 30.

Specifically, the shell 10 includes an assembly end 12 and an air outlet end 14 opposite to each other, and an air outlet channel 15 is formed at the air outlet end 14. The vaporization assembly 30 includes a connecting tube 32 and a vaporization core 34 that is assembled in the connecting tube 32. The connecting tube 32 extends into the shell 10 and is mated with the air outlet end 14. The connecting tube 32 and an inner wall of the shell 10 are enclosed to form a liquid storage cavity 20, and the vaporization core 34 includes the vaporization channel 35 in communication with the air outlet channel 15. A through hole 33 facing the vaporization core 34 is provided on the connecting tube 32. When the liquid storage cavity 20 accommodates an aerosol generation substrate, the aerosol generation substrate enters the vaporization core 34 through the through hole 33. The vaporization core 34 generates an aerosol by heating and vaporizing the substrate, and finally the aerosol generated after vaporization flows from the vaporization channel 35 to the air outlet channel 15 for the user to use. Optionally, the vaporization core 34 is a ceramic member.

In some embodiments, the electrode assembly 40 includes an insulating member 50, a first electrode 70, and a second electrode 80. The insulating member 50 is at least partially sleeved on the vaporization assembly 30, the first electrode 70 is sleeved in the insulating member 50, and the second electrode 80 is sleeved on the insulating member 50, so that the first electrode 70 and the second electrode 80 are insulated from each other by the insulating member 50. An air through channel 60 in communication with the vaporization channel 35 is defined and formed between the first electrode 70 and the insulating member 50. In this way, the external air flow can not only enter the vaporization channel 35 through a hollow channel of the first electrode 70, but also enter the vaporization channel 35 through the air through channel 60 between the first electrode 70 and the insulating member 50, so that two branches are formed for the air to enter to increase air inflow and optimize the vaporization effect.

Specifically, the insulating member 50 is at least partially sleeved at an end of the connecting tube 32 that is away from the air outlet end 14, and the second electrode 80 is sleeved between the connecting tube 32 and an inner wall of the assembly end 12. On the one hand, the liquid storage cavity 20 between the connecting tube 32 and the shell 10 may be closed by the second electrode 80, and on the other hand, both the first electrode 70 and the second electrode 80 are electrically connected to the vaporization core 34, so as to lead out two electrodes for the vaporization core 34 through the first electrode 70 and the second electrode 80. In this way, the first electrode 70 and the second electrode 80 are butted with the main unit 210 to supply power to the vaporization core 34.

In some embodiments, when the vaporizer 100 is mounted on the main unit 210, the second electrode 80 is mated with the main unit 210 to form a first air inlet branch 90 in communication with the air through channel 60. The external air may enter the air through channel 60 through the first air inlet branch 90, and finally be discharged from the vaporization channel 35 and the air outlet channel 15, and air inlet is implemented through the first air inlet branch 90. In addition, a second air inlet branch 91 in communication with the air through channel 60 is formed on the second electrode 80. The external air flow may enter the air through channel 60 through the first air inlet branch 90 and the second air inlet branch 91, so as to further increase air inflow and improve the vaporization effect.

Further, a plurality of air through holes 81 are provided on the second electrode 80. The plurality of air through holes 81 are arranged in a circumferential direction of the second electrode 80, and each of the air through holes 81 is in communication with the air through channel 60. The plurality of air through holes 81 form the second air inlet branch. In this way, in addition to entering the air through channel 60 through the first air inlet branch 90, the external air may further enter the air through channel 60 through the second air inlet branch formed by the plurality of air through holes 81, to increase air inlet branches and air inflow.

In some embodiments, the main unit 210 includes a body 211 and a matching member 213 sleeved on the body 211. The second electrode 80 and the matching member 213 are detachably mated, and the first air inlet branch 90 is defined and formed between the second electrode 80 and the matching member 213. In this way, the detachable mating between the second electrode 80 and the matching member 213 implements detachable mating between the vaporizer 100 and the main unit 210. In addition, the first air inlet branch 90 is formed between the second electrode 80 and the matching member 213, allowing the external air flow to enter the first air inlet branch 90 and then enter the air through channel 60; the external air flow may also enter the air through channel from the second air inlet branch of the second electrode 80.

Further, a front air inlet channel 92 in communication with the outside is further defined and formed between the second electrode 80 and the matching member 213. The first air inlet branch 90 and the second air inlet branch 91 are both communicated between the front air inlet channel 92 and the air through channel 60. In this way, an air flow entering the front air inlet channel 92 from the outside enters the air through channel 60 from the first air inlet branch 90 of the second electrode 80. Another air flow enters the air through channel 60 from the second air inlet branch 91 on the second electrode 80, that is, enters the air through channel 60 from the plurality of air through holes 81 on the second electrode 80.

Specifically, the second electrode 80 includes a first connection portion 82 and a second connection portion 84. The first connection portion 82 is detachably sleeved on the assembly end 12, and the second connection portion 84 is connected to the first connection portion 82 and protrudes from the shell 10. The first connection portion 82 is butted with the matching member 213, and the front air inlet channel 92 is defined and formed between the first connection portion 82 and the matching member 213; the second connection portion 84 is detachably connected to the matching member 213, and the first air inlet branch 90 is defined and formed between the second connection portion 84 and the matching member 213. The air through hole 81 is communicated between the front air inlet channel 92 and the air through channel 60, and the first air inlet branch 90 is communicated between the front air inlet channel 92 and the air through channel 60. During assembling, after the second connection portion 84 is detachably connected to the matching member 213, the first connection portion 82 may be butted with the matching member 213. In this way, the front air inlet channel 92 and the first air inlet branch 90 are formed by the first connection portion 82 and the second connection portion 84 respectively. The external air flow may enter the first air inlet branch 90 through the front air inlet channel 92, and then enter the air through channel 60 from the first air inlet branch 90; and the external air flow may also enter the air through hole 81 through the front air inlet channel 92, and then enter the air through channel 60 from the air through hole 81.

Figure 3:
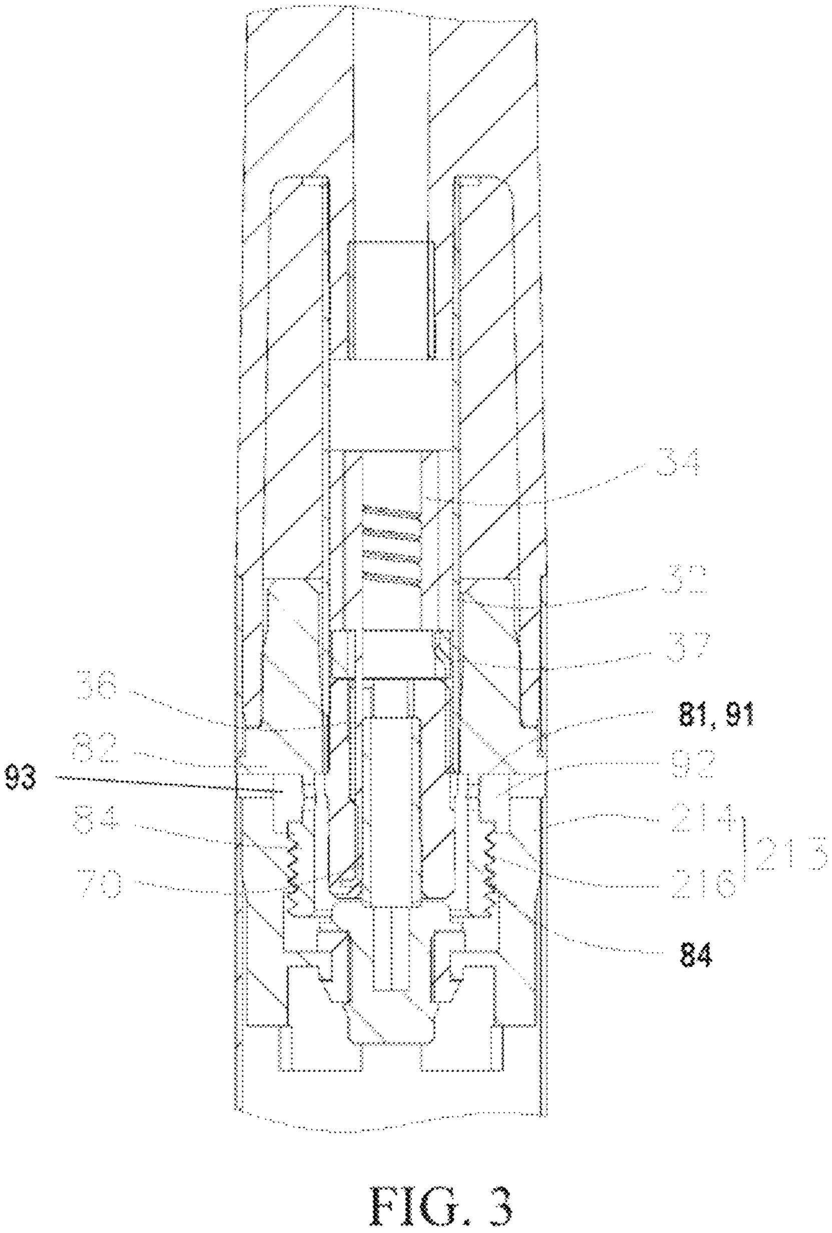
FIG. 3 is a schematic cross-sectional view of the electronic vaporization device shown in FIG. 1 from another perspective.
Figure 4:
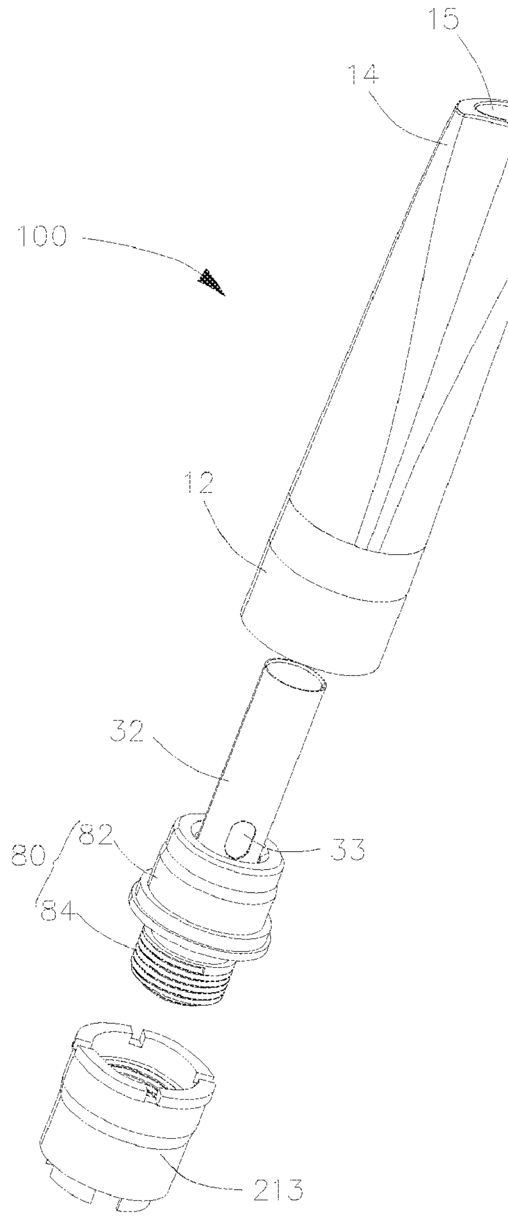
FIG. 4 is a partial exploded schematic view of the electronic vaporization device shown in FIG. 1.
Figure 5:
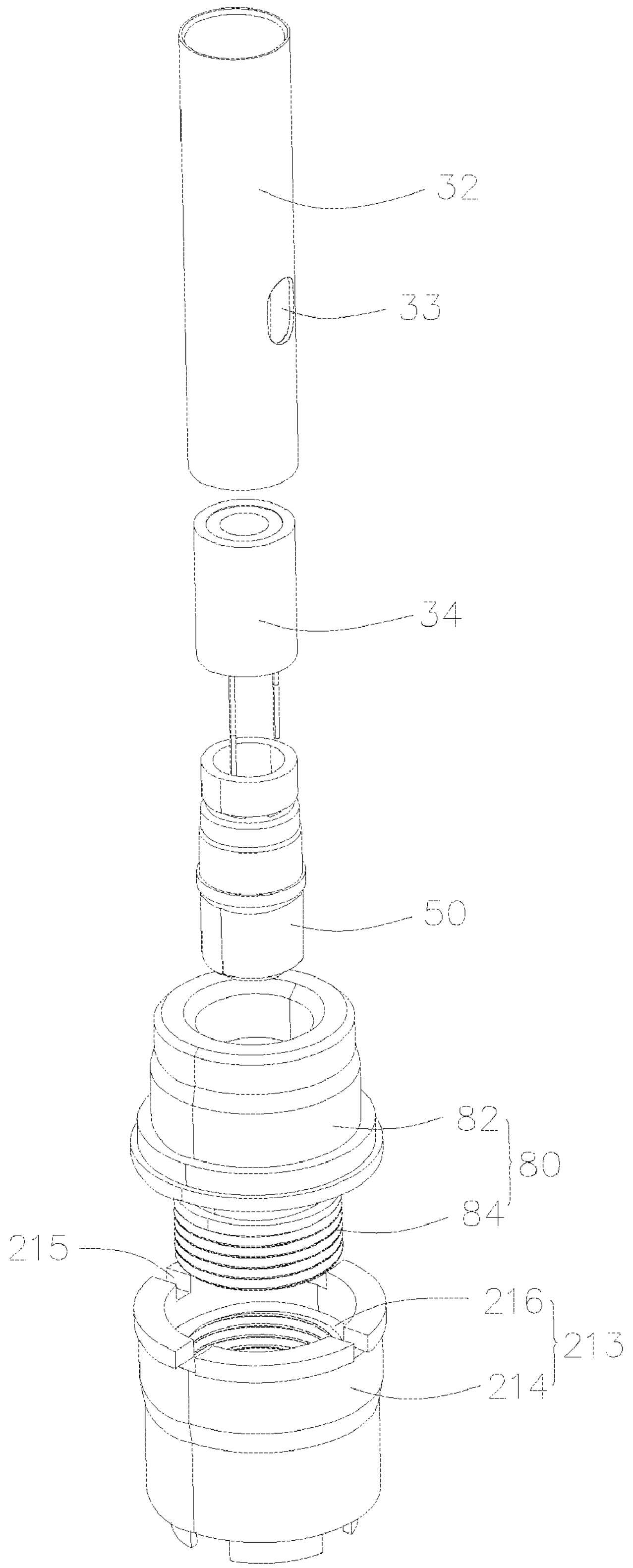
FIG. 5 is a further exploded schematic view of the electronic vaporization device shown in FIG. 4 from a perspective.
Figure 8:
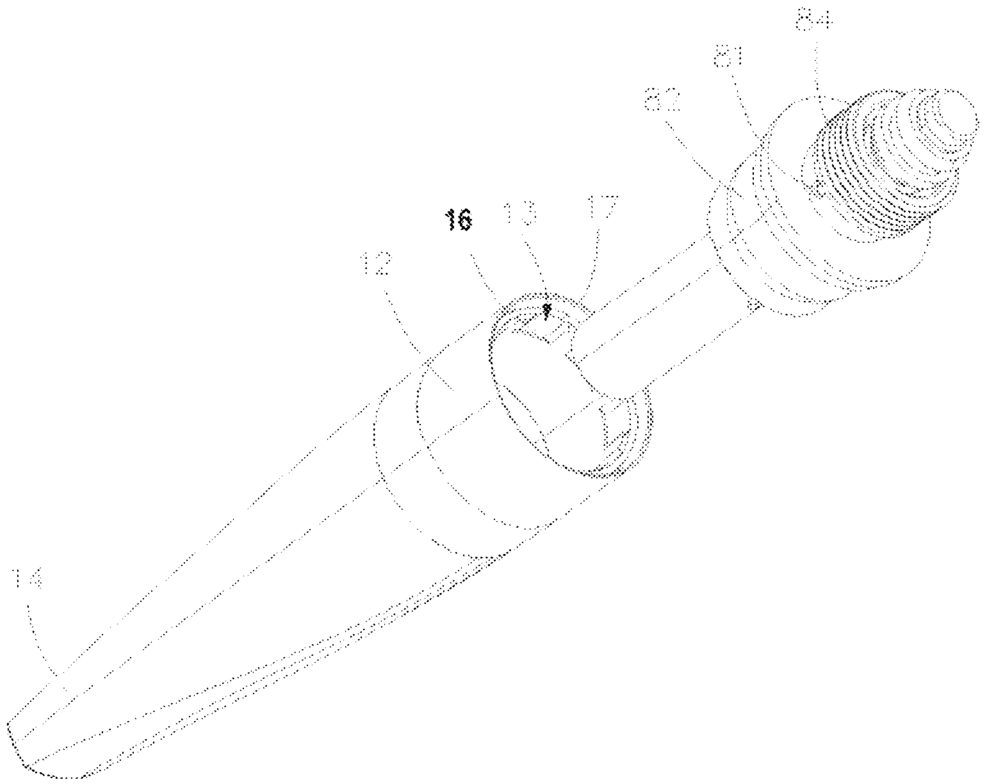
FIG. 8 is an exploded schematic view of the electronic vaporization device shown in FIG. 4 from another perspective.

In addition, referring to FIG. 3 and FIG. 8, the second connection portion 84 is spaced apart from a portion of the insulating member 50 that is not sleeved into the connecting tube 32. The air entering the air through hole 81 may pass through the space between the second connection portion 84 and the insulating member 50 to an end portion of the insulating member 50, and then enter the air through channel 60 between the insulating member 50 and the first electrode 70. Referring to FIG. 3 to FIG. 5, specifically, the matching member 213 includes a ring body 214 and a protrusion 216. An inner wall of the ring body 214 is provided with a protrusion 216. The second connection portion 84 extends into the ring body 214 and is detachably connected to the protrusion 216. The first connection portion 82 is butted with the ring body 214, and the front air inlet channel 92 is defined and formed among the protrusion 216, the ring body 214, the first connection portion 82 and the second connection portion 84. In addition, the plurality of air inlet holes 215 in communication with the front air inlet channel 92 are provided on the ring body 214. In this way, when the second electrode 80 is mated with the matching member 213, the second connection portion 84 is mated with the protrusion 216 of the matching member 213, and the second connection portion 84 is butted with the ring body 214. In this way, after the mating is completed, the front air inlet channel 92 may be defined and formed among the ring body 214, the protrusion 216, the first connection portion 82 and the second connection portion 84, so that the external air flow is allowed to enter the front air inlet channel 92 through the air inlet holes 215 provided on the ring body 214.

Optionally, the front air inlet channel 92 is extended in a circumferential direction of the ring body 214, and the air flow can be delivered to various positions in the circumferential direction of the ring body 214, thereby ensuring the air inlet effect.

Specifically, the second connection portion 84 is in threaded connection with the matching member 213, and a gap formed by the threaded connection between the second connection portion 84 and the matching member 213 is configured to the first air inlet branch 90. In this way, the vaporizer 100 and the main unit 210 are detachably mated through the threaded connection, which facilitates assembly. In addition, a gap formed by the threaded connection is used as the first air inlet branch 90 to increase air inflow.

Figure 2:
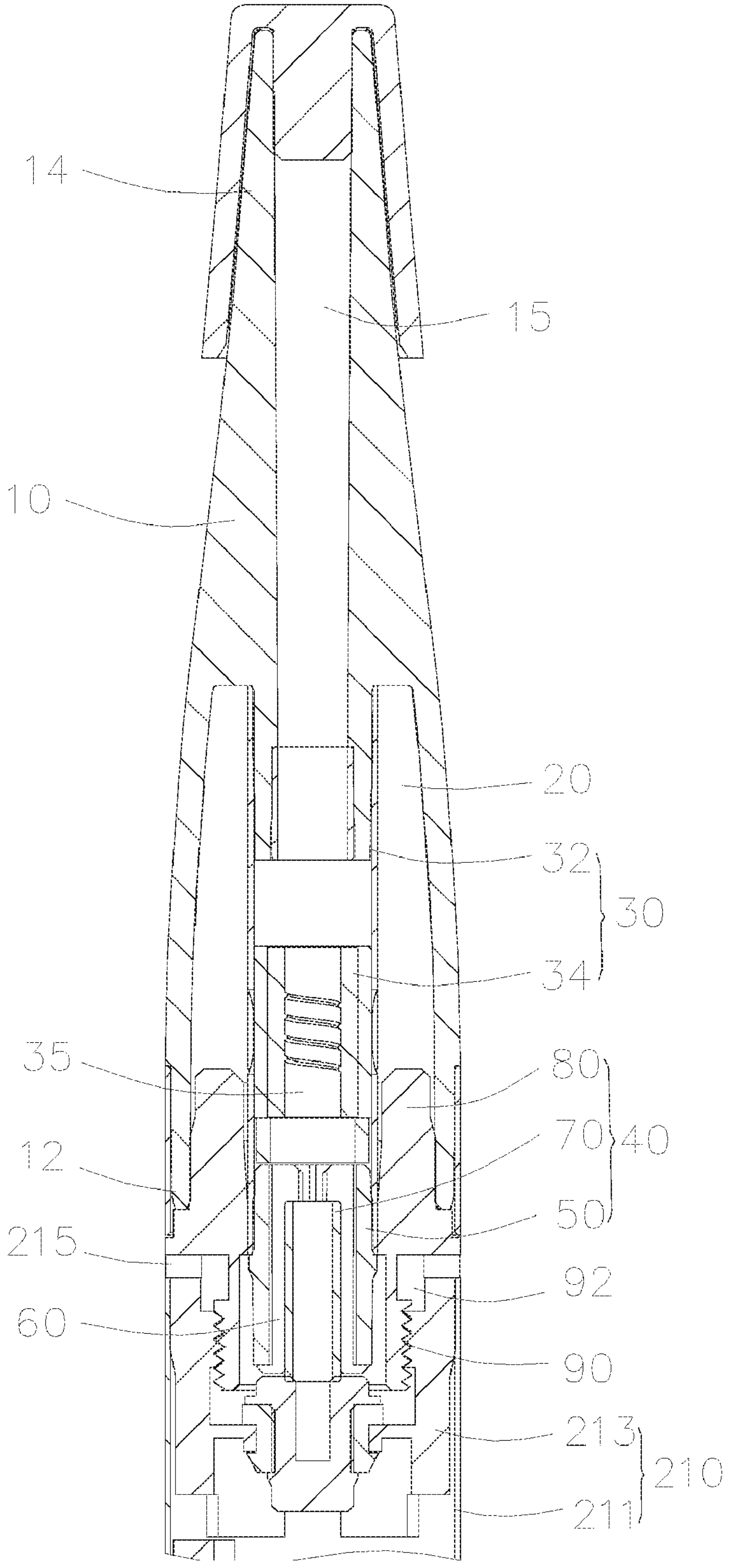
FIG. 2 is a schematic cross-sectional view of the electronic vaporization device shown in FIG. 1 from a perspective.
Figure 6:
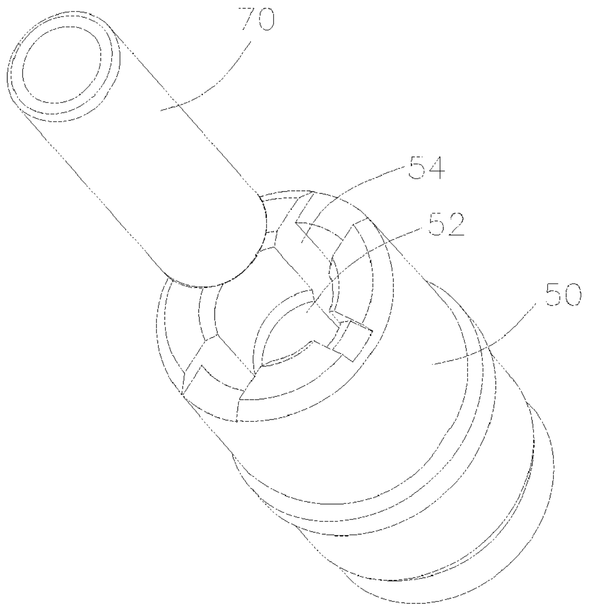
FIG. 6 is a further partial exploded schematic view of the electronic vaporization device shown in FIG. 5.

Referring to FIG. 2 and FIG. 6, in some embodiment, the mounting through hole 51 runs through the insulating member 50, and the air through groove 54 in communication with the mounting through hole 51 is provided on an inner wall of the mounting through hole 51. The first electrode 70 is sleeved in the mounting through hole 51, and the air through channel 60 is formed at an interval between the first electrode 70 and an inner wall of the air through groove 54.

In this way, the first electrode 70 is assembled on the insulating member 50, and the air through channel 60 is formed between the insulating member 50 and the first electrode 70 to allow the external air flow to flow from the air through channel 60 to the vaporization channel 35.

Further, the air through channel 60 runs through the insulating member 50 along an axial direction, so that the air flow in the air inlet channel 90 may enter from an end of the axial direction of the insulating member 50, and then flows out of the other end of the axial direction of the insulating member 50 and then enters the vaporization channel 35 located above, to implement the function of supplying air to the vaporization channel 35.

Figure 7:
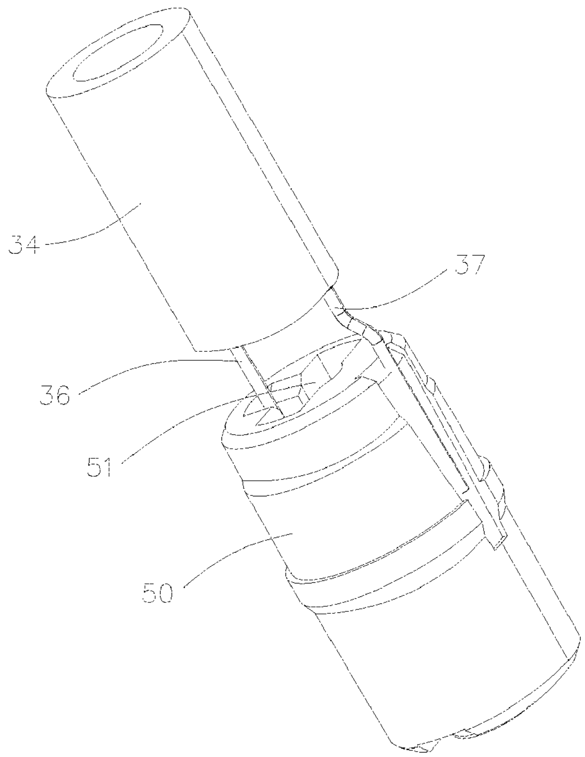
FIG. 7 is a schematic diagram of assembly of a vaporization core and an insulating member in the electronic vaporization device shown in FIG. 5.

Referring to FIG. 3 and FIG. 7, in some embodiments, the vaporization core 34 includes a first electrode pin 36 and a second electrode pin 37. The first electrode pin 36 and the second electrode pin 37 are sleeved at an interval on the insulating member 50, and the first electrode pin 36 is electrically connected to the first electrode 70. The second electrode pin 37 is electrically connected to the second electrode 80. In this way, after the first electrode pin 36 and the second electrode pin 37 are electrically connected to the first electrode 70 and the second electrode 80 respectively, the vaporization core 34 is electrically connected to the first electrode 70 and the second electrode 80. In addition, the first electrode pin 36 and the second electrode pin 37 are sleeved at an interval on the insulating member 50, so that the first electrode pin 36 and the second electrode pin 37 are sleeved and mounted through the insulating member 50 to facilitate assembly.

Further, the first electrode pin 36 abuts against an inner wall, which faces the mounting through hole 51, of the insulating member 50 and is in contact with the first electrode 70, and the second electrode pin 37 abuts against an outer wall of the insulating member 50 and is electrically connected to the second electrode 80. The first electrode pin 36 and the second electrode pin 37 abut against the inner wall and the outer wall of the insulating member 50 respectively, so that the first electrode pin 36 and the second electrode pin 37 are sleeved at an interval on the insulating member 50. In addition, the first electrode pin 36 abuts against the inner wall of the insulating member 50 and is just in contact with the first electrode 70 sleeved in the insulating member 50, so that the first electrode pin 36 is electrically connected to the first electrode 70.

In addition, the second electrode pin 37 abuts against the outer wall of the insulating member 50. When the insulating member 50 is sleeved into the connecting tube 32, the second electrode pin 36 may just be in contact with the connecting tube 32, and then the second electrode 80 is sleeved between the connecting tube 32 and the assembly end 12 of the shell 10. In this way, the second electrode pin 37 is electrically connected to the second electrode 80 through the connecting tube 32, so that the second electrode 80 is electrically connected to the second electrode pin 37. Optionally, the connecting tube 32 is a conductive member.

Referring to FIG. 8, in some embodiments, a plurality of exhaust grooves 13 are provided on an inner wall of the assembly end 12. The plurality of exhaust grooves 13 are arranged at intervals in an axial direction of the assembly end 12, and each of the exhaust grooves 13 includes a first opening 16 and a second opening 17. The first opening 16 faces the second electrode 80, and the second opening 17 intersects with and is in communication with the first opening 16 and faces away from the air outlet end 14. In this way, when being sleeved, the second electrode 80 gradually blocks the first opening 16. However, only when the second electrode 80 is sleeved can the second electrode 80 abut against the second opening 17 that faces away from the air inlet end and that is provided on the assembly end 12, so that the second opening 17 is closed. Before the second electrode 80 is not assembled in place, the second opening 17 is always in an opening state, and the first opening 16 is not directly closed but gradually closed. Therefore, there is a period of time during which the first opening 16 is in communication with the second opening 17, and the air in the liquid storage cavity 20 may be discharged during the period of time.

During assembling, the vaporization core 34 is sleeved on an inner wall of the connecting tube 32, and the first electrode 70 is assembled on the insulating member 50. The insulating member 50 is at least partially sleeved on an end portion of the connecting tube 32. Then, an end of the connecting tube 32 that is away from the insulating member 50 is extended into the shell 10, and the connecting tube 32 is butted with the air outlet channel 14, so that the vaporization channel 35 of the vaporization core 34 is in communication with the air outlet channel 15 of the air outlet end 14. Finally, the aerosol generation substrate is injected into the liquid storage cavity 20 between the connecting tube 32 and the shell 10, and the second electrode 80 is sleeved between the connecting tube 32 and the outside. When the second electrode 80 is gradually sleeved, the second electrode 80 gradually blocks the first opening 15 of the exhaust groove 13. When the first opening 15 is not completely blocked, the air in the liquid storage cavity 20 may flow to the second opening 17 through the first opening 15 of the exhaust groove 13, and then be discharged to the outside. In this way, when the liquid storage cavity 20 is completely sealed by the second electrode 80, a part of the air in the liquid storage cavity 20 is discharged, and the liquid storage cavity 20 has more space for storing the aerosol generation substrate.

Therefore, more aerosol generation substrates are injected during liquid injection, and a part of the air in the liquid storage cavity 20 is effectively discharged through the exhaust groove 13 during sealing, so that sufficient accommodation space may be provided for more aerosol generation substrates to prevent spillage of the aerosol generation substrates during sealing. Finally, more aerosol generation substrates are stored in the liquid storage cavity 20 for the user to prolong the use time and improve the use experience.

Referring to FIG. 2, in addition, the vaporization core 34 is located at an end of the connecting tube 32 that is close to the assembly end 12, that is, the vaporization core 34 is away from the air inlet end. During liquid injection and transportation, the assembly end 12 opens upward, and the air outlet end 14 faces downward. The action of gravity of the aerosol generation substrate is directed to the air outlet end 14, preventing the aerosol generation substrate from flowing to the vaporization core 34 that is away from the air outlet end 14 under the effect of gravity, and preventing the aerosol generation substrate from leaking along the vaporization core 34.

Referring to FIG. 1 to FIG. 5, in an embodiment of the present utility model, the vaporizer 100 is further provided. The external air flow may enter the air through channel 60 through the first air inlet branch and the second air inlet branch on the second electrode 80, so that two branches are formed for the air to enter to increase air inflow and optimize the vaporization effect.

The technical features in the above embodiments may be randomly combined. For concise description, not all possible combinations of the technical features in the embodiment are described. However, provided that combinations of the technical features do not conflict with each other, the combinations of the technical features are considered as falling within the scope recorded in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vaporizer, cooperating with a main unit to implement vaporization, the vaporizer comprising:

a shell in which an air outlet channel is formed;

a vaporization assembly comprising a vaporization channel in fluid communication with the air outlet channel; and an electrode assembly mated with the vaporization assembly and comprising an insulating member, a first electrode, and a second electrode, the insulating member being at least partially sleeved on the vaporization assembly, the first electrode being sleeved in the insulating member, and the second electrode being sleeved outside the insulating member, wherein an air through channel in communication with the vaporization channel is defined and formed between the first electrode and the insulating member.

2. The vaporizer of claim 1, wherein, when the vaporizer is mounted on the main unit, the second electrode is mated with the main unit to form a first air inlet branch in communication with the air through channel, and wherein a second air inlet branch in communication with the air through channel is formed on the second electrode.

3. The vaporizer of claim 2, wherein a plurality of air through holes are provided on the second electrode, the plurality of air through holes being arranged in a circumferential direction of the second electrode, each air through of the plurality of air through holes being in communication with the air through channel, and wherein the plurality of air through holes form the second air inlet branch.

4. The vaporizer of claim 1, wherein a mounting through hole runs through the insulating member, and an air through groove in communication with the mounting through hole is provided on an inner wall of the mounting through hole, and wherein the first electrode is sleeved in the mounting through hole, and the air through channel is defined and formed between the first electrode and an inner wall of the air through groove.

5. The vaporizer of claim 1, wherein the vaporization assembly comprises a vaporization core, the vaporization core comprising a first electrode pin and a second electrode pin, the first electrode pin and the second electrode pin being sleeved at an interval on the insulating member, and wherein the first electrode pin is electrically connected to the first electrode and the second electrode pin is electrically connected to the second electrode.

6. The vaporizer of claim 5, wherein the first electrode pin abuts an inner wall, which faces the mounting through hole, of the insulating member and is in contact with the first electrode, and wherein the second electrode pin abuts an outer wall of the insulating member and is electrically connected to the second electrode.

7. The vaporizer of claim 1, wherein the shell comprises an air outlet end and an assembly end opposite to each other, the air outlet end forming the air outlet channel, the second electrode being sleeved between the assembly end and the vaporization assembly, wherein a plurality of exhaust grooves are provided on an inner wall of the assembly end, the plurality of exhaust grooves being arranged at intervals in a circumferential direction of the assembly end, and wherein each exhaust groove of the plurality of exhaust grooves comprises a first opening and a second opening, the first opening facing the second electrode, and the second opening intersecting with and being in communication with the first opening and facing away from an air outlet end.

8. An electronic vaporization device, comprising:

the vaporizer of claim 2; and the main unit, wherein the main unit comprises a body and a matching member sleeved on the body, and the second electrode and the matching member are detachably mated, and wherein the first air inlet branch is defined and formed between the second electrode and the matching member.

9. The electronic vaporization device of claim 8, wherein a front air inlet channel in communication with outside air is further defined and formed between the second electrode and the matching member, wherein the second electrode comprises a first connection portion and a second connection portion, the first connection portion being detachably sleeved on the assembly end, and the second connection portion being connected to the first connection portion and protruding from the shell, wherein the first connection portion is butted with the matching member, the front air inlet channel is defined and formed between the first connection portion and the matching member, the second connection portion is detachably connected to the matching member, and a rear air inlet channel is defined and formed between the second connection portion and the matching member, and wherein both the first air inlet branch and the second air inlet branch are communicated between the front air inlet channel and the air through channel.

10. The electronic vaporization device of claim 9, wherein the matching member comprises a ring body and a protrusion, the protrusion is arranged on an inner wall of the ring body, the second connection portion extends into the ring body and is detachably connected to the protrusion, the first connection portion is butted with the ring body, and the front air inlet channel is defined and formed among the protrusion, the ring body, the first connection portion, and the second connection portion, and wherein a plurality of air inlet holes in communication with the front air inlet channel are provided on the ring body.

11. The electronic vaporization device of claim 9, wherein the second connection portion is in threaded connection with the matching member, and wherein a gap formed by the threaded connection between the second connection portion and the matching member is configured to form the first air inlet branch.

* * * * *